Patented Jan. 10, 1939

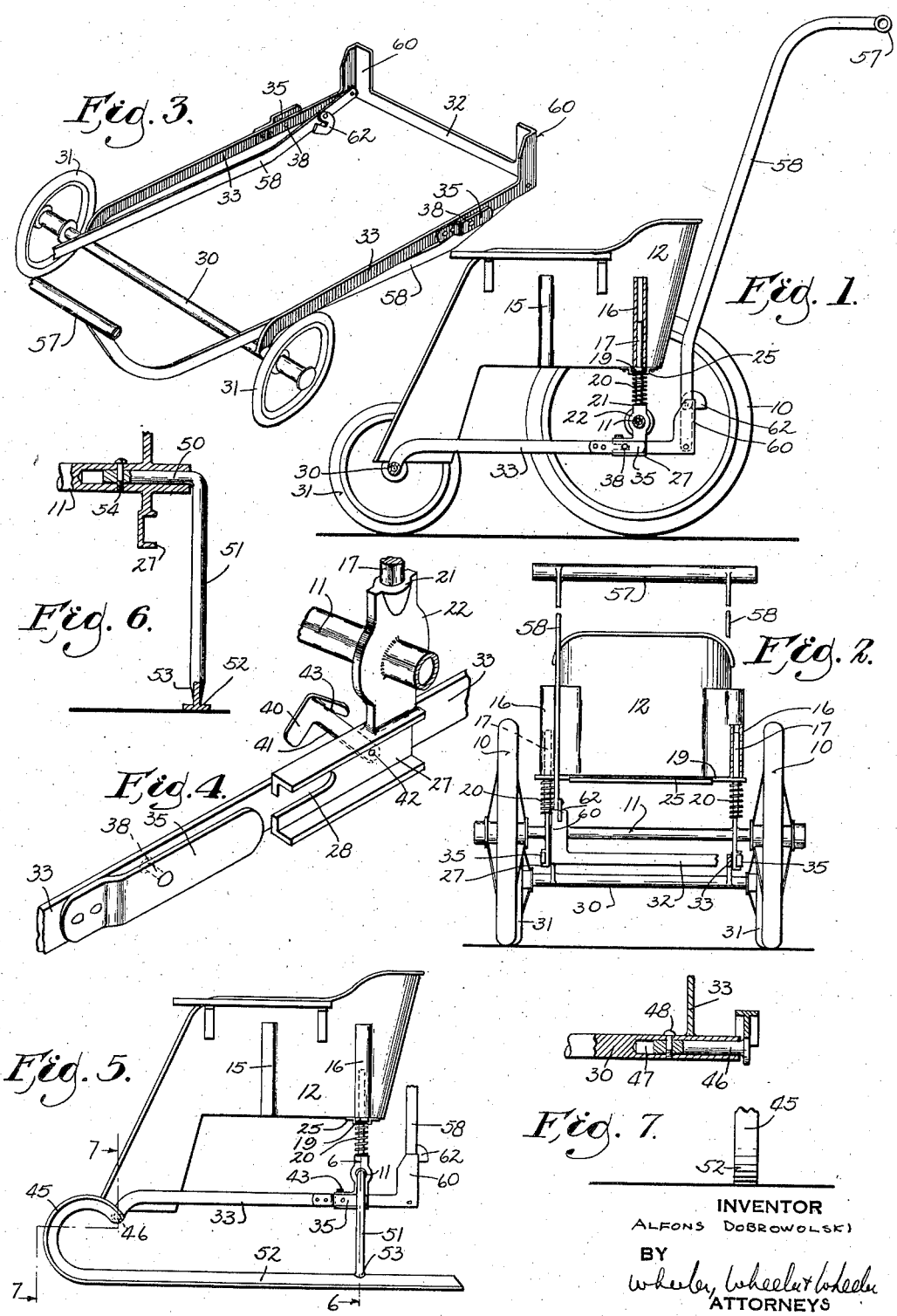

2,143,548

UNITED STATES PATENT OFFICE 2,143,548

CONVERTIBLE CARRIAGE FOR CHILDREN

Alfons Dobrowolski, Racine, Wis.

Application December 22, 1937, Serial No. 181,112

6 Claims. (Cl. 280—8)

My invention relates to improvements in convertible carriages for children. In a companion application Serial No. 181,113 bearing even date herewith, I have shown and described a tricycle having an auxiliary rear seat adapted to be supported over the rear axle in either a forwardly or a rearwardly facing position, the tricycle frame being of a special construction, whereby a foot supporting step and the feet of the passenger occupying the rear seat may be received between the sides of the frame when the seat is facing forwardly.

The object of the invention herein disclosed is to provide a rear wheel and axle assembly and auxiliary equipment which may be utilized as the rear portion of either a tricycle or a gocart, and which, with runners substituted for the rear wheels, may be converted into a sled.

A further object of the invention herein disclosed is to provide auxiliary running equipment for slip-joint connection with the detachable rear axle of a tricycle, whereby the rear axle and auxiliary equipment may be utilized to produce a four wheeled vehicle or a baby carriage.

A further object is to provide a sub-frame for quick detachable connection with the rear axle of a tricycle, or assembly in suspended connection with said rear axle to facilitate conversion into a four wheeled vehicle or into a sled.

In the drawing:

Figure 1 is an assembled view, in side elevation, of a four wheeled vehicle or push cart embodying my invention.

Figure 2 is a rear view of the same.

Figure 3 is a view of the sub-frame, forward axle and wheels, showing the handle bars in a folded position.

Figure 4 is a detail view showing a fragment of the rear axle, one of the suspended hangers associated with the axle, and a connecting frame bar, in a partially assembled position with reference to the hanger.

Figure 5 is a side elevation of the rear axle and seat assembly, when assembled in association with sled runners.

Figure 6 is a detail view of the connection between the rear axle and a sled runner, the rear axle hub and a runner being illustrated in section.

Figure 7 is a fragmentary sectional view drawn to line 6—6 of Figure 5.

Like parts are identified by the same reference characters throughout the several views.

The rear wheels 10, axle 11, and seat or carriage body 12, may be used interchangeably as parts of the gocart or four wheeled conveyance shown in Figure 1, or as the rear parts of a tricycle similar to that disclosed in said companion application, or that disclosed in my former patent for an Auxiliary seat for tricycles, No. 1,374,911, and dated April 19, 1921. But for the purposes of the invention herein disclosed, the body 12 will preferably be provided with two guide housings 15 and 16 on the exterior surfaces of the side walls of the body, and in either one of which a supporting post 17 is adapted to be received.

In Figures 1 and 2, the rear end of the body portion 12 is mounted upon a cross bar 19, which is apertured to receive supporting posts 17, and this bar may be supported by springs 20 which are coiled about said posts between the bar and shoulders 21 at the upper ends of mounting pieces or bolsters 22 on the rear axle 11. If desired, the cross bar 19 may be closely held to the bottom of the body 12 by suitable brackets 25.

The mounting pieces or bolsters 22 extend downwardly below the axle 11 in the form of hangers. Each supports a channeled member or bar 27, the central web of which has an open ended slot 28 in its forward end. A rectangular frame (Figure 3), having an axle 30 at its forward end, is normally supported by wheels 31. Its rear cross bar 32 is connected with the axle by the side bars 33 of the frame, and each of these side bars has a bracket secured to its outer face and provided with a laterally offset arm 35 adapted for sliding engagement in the channel bar 27 when the frame is being connected with the above described rear axle 11.

A cross pin 38 connects an intermediate portion of each arm 35 with its associated frame bar 33, and, as indicated in Figure 4, when the connecting bracket members 35 enter the channels in the bars 27, these side bars 33 of the frame will move along the inner faces of the channel bars 27. Movement in the channel may continue until the cross pins or rivets reach the inner ends of the slots 28 in the channel bars. Each of these rivets or bolts 38 may then be engaged by a latch head 40, having an arm 41 pivoted to the inner face of its channel bar at 42. Each latch head 40 is adapted to be swung downwardly to a locking engagement with the pin or bolt 38.

The above described rectangular frame may thus be made to serve as a quick detachable sub-frame for connecting a tricycle rear axle with auxiliary supporting wheels or runners.

A grasping piece 43 on each latch head serves as a stop to engage the channel bar and limit the downward movement of the latch. It also facilitates lifting the latch to releasing position when the rear axle is to be separated from the frame. When the latches are lifted at both sides of the sub-frame, the rear axle and seat or carriage 12 may be withdrawn rearwardly, or the sub-frame drawn forwardly until the bracket members 35 are disengaged, as shown in Figure 4.

The axles 11 and 30 are tubular, at least in their end portions, whereby, when the wheels are removed, the upwardly curving end portions 45 of a set of sled runners may be connected with the axle 30 by pins 46 which fit the axle tubes or sockets 47, (Figure 7). The pins 46 may be secured in their sockets by screws 48.

The rear axle 11 may similarly receive the elbowed upper end portions 50 of supporting posts 51, the lower ends of which are welded or otherwise secured to the rear end portions of the sled runners 52, as indicated at 53 in Figure 5. The elbowed upper ends of these posts 51 are socketed in the rear axle and secured by screws or pins 54, as shown in Figure 6.

A handle or push bar 57 is pivotally secured to the rear portion of the frame by side arms 58, and at the rear corners of the frame upwardly extending flanged shoulders 60 are provided which serve as stops to support the handle in the raised position indicated in Figure 1. The side bars of the handle may be locked in this position by pivoted latches 62, which may be moved to releasing position when the sub-frame is withdrawn from the rear axle and the handle supporting arms folded, as shown in Figure 3. It will, of course, be understood that the handle will be supported in the raised position when the sub-frame is assembled with sled runners, as shown in Figure 5.

With the aid of a sub-frame of the type shown in Figure 3, my improved tricycle seat and rear axle assembly may be detached from a tricycle frame and connected with a set of front wheels by manipulating the sub-frame to adjust its connecting bracket members 35 into the channel bars 27 and locking them in position by means of the latches 49. Thereupon the sub-frame axle and the rear axle may be supported by wheels, as shown in Figure 1, or by runners as shown in Figure 5, the sub-frame serving as an auxiliary or intermediate support or means to facilitate such connection with quick detachable wheels or runners.

I claim:

1. In a convertible carriage for children, the combination with a seat body and axle, of a set of hangers depending from the axle, a channel bar secured to each hanger with outwardly facing upper and lower flanges in substantially horizontal planes, a vehicle frame having side bars adapted to fit between the channel bars of the respective hangers, brackets carried by the outer faces of the side bars and provided with outwardly offset slide arms adapted to fit between the channel bar flanges, and means for locking said slide arms and side bars in the channels of such bars.

2. In a convertible tricycle, pushcart and sled assembly, a body provided with sets of post receiving socket members on its respective side walls, the members of one set being medially located and adapted for connection of the body with a set of supporting posts, either in a forwardly or rearwardly facing position, and the members of the other set being located near the rear end of the body; and post carrying means for supporting the body either from tricycle and pushcart wheels or from sled runners.

3. In a convertible tricycle, pushcart and sled assembly, an axle provided with body supporting posts, tubular wheel receiving ends, headed pins receivable in the axle ends for connecting either wheels or sled runners thereto, and interchangeable frame members adapted for detachable slip-joint connection with the axle for adapting said assembly for use as the rear portion of a tricycle, a gocart, or a sled.

4. In combination, an axle bar provided with socketed wheel receiving journals at its respective ends, wheel retaining headed pins adapted to be anchored in said sockets, coupling members attached to intermediate portions of the axle bar and adapted for interlocking engagement with counterpart couplings carried by tricycle, pushcart, and sled frames, and latches pivoted to said coupling members and adapted to be swung into engagement with counterpart members to retain them in interlocking relation.

5. In combination, an axle bar provided with socketed wheel receiving journals at its respective ends, wheel retaining headed pins adapted to be anchored in said sockets, coupling members attached to intermediate portions of the axle bar and adapted for interlocking engagement with counterpart couplings carried by tricycle, pushcart, and sled frames, and latches pivoted to said coupling members and adapted to be swung into engagement with counterpart members to retain them in interlocking relation, said coupling members and headed pins being adapted to cooperate with each other for conversion of a carriage for children into a tricycle, a pushcart, or a sled.

6. In a device of the described class, the combination with a rear axle and carriage body assembly, of an intermediate frame provided with means at one end for either wheel or sled runner connection, slip-joint coupling connections adapted to secure the other end of the frame to said rear axle assembly, latch mechanism for holding the members of said coupling in interlocking slip-joint relationship, said sub-frame being provided with a folding handle, and means for securing the handle in an upright position in the rear of said assembly.

ALFONS DOBROWOLSKI.